(12) United States Patent
Wang et al.

(10) Patent No.: US 8,624,973 B2
(45) Date of Patent: Jan. 7, 2014

(54) ELECTRONIC DEVICE WITH MEASUREMENT FUNCTION AND MEASUREMENT METHOD THEREOF

(75) Inventors: Chung-Jen Wang, New Taipei (TW); Li-Sheng Shu, Shenzhen (TW); Bi-Qing Luo, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 309 days.

(21) Appl. No.: 13/163,737

(22) Filed: Jun. 20, 2011

(65) Prior Publication Data

US 2012/0169867 A1    Jul. 5, 2012

(30) Foreign Application Priority Data

Dec. 31, 2010    (CN) .......................... 2010 1 0616852

(51) Int. Cl.
*H04N 7/18*    (2006.01)
*G09G 5/00*    (2006.01)
*G06K 9/00*    (2006.01)

(52) U.S. Cl.
USPC ............................... 348/135; 345/8; 382/131

(58) Field of Classification Search
USPC ................................ 348/135–142, 8; 382/131
See application file for complete search history.

(56) References Cited

U.S. PATENT DOCUMENTS

2012/0218418 A1*    8/2012    Strandemar ................... 348/164
2013/0022231 A1*    1/2013    Nepomniachtchi et al. .. 382/102

* cited by examiner

*Primary Examiner* — Dave Czekaj
*Assistant Examiner* — Tsion B Owens
(74) *Attorney, Agent, or Firm* — Altis Law Group, Inc.

(57) ABSTRACT

A method for measuring size of an object is provided. The method includes controlling a distance measurement unit to measure a vertical distance between an electronic device and the object in response to a measurement operation, controlling an image capturing unit to capture an image in front of the electronic device, which includes an image of the object in response to the measurement operation. Computing an actual size of the captured area according to the distance measured by the distance measurement unit and an angle of view of the image capturing unit. In addition, obtaining the image of the object from the captured image, and further computing the proportion of the image of the object in the captured image. Then computing the size of the object according to the proportion and the actual size of the captured area, and displaying the measured size of the object.

7 Claims, 3 Drawing Sheets

ELECTRONIC DEVICE WITH MEASUREMENT FUNCTION AND MEASUREMENT METHOD THEREOF

BACKGROUND

1. Technical Field

The present disclosure relates to an electronic device with a measurement function and a measurement method thereof.

2. Description of Related Art

Sometimes, people need to estimate a size of an object. However, when there is no measuring tool, the size of the object cannot be measured. Currently, the portable electronic device, such as a cell phone, is almost a necessity for people. Therefore the portable electronic device with a measurement function is needed.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
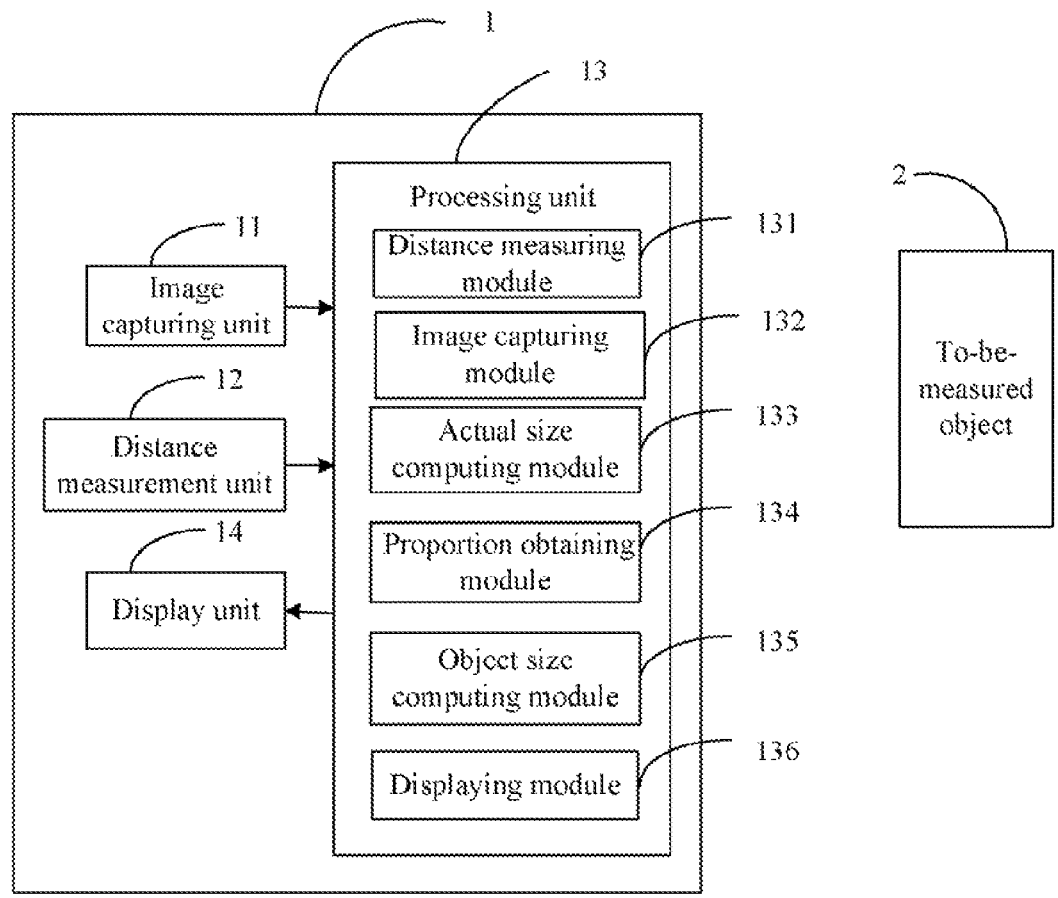
FIG. 1 is a block diagram of an electronic device with a measurement function in accordance with an exemplary embodiment.

FIG. 1 is a block diagram of an electronic device 1 with a measurement function in accordance with an exemplary embodiment. After the measurement function of the electronic device 1 is active, the electronic device 1 can measure a size of a to-be-measured object 2. In the present disclosure, the size includes width and length of the to-be-measured object 2. The measuring method for the length of the to-be-measured object 2 is the same as the measuring method for the width of the to-be-measured object 2. Therefore, only the measuring method for the length of the to-be-measured object 2 is taken for example to describe in the following.

The electronic device 1 includes an image capturing unit 11, a distance measurement unit 12, a processing unit 13, and a display unit 14. The distance measurement unit 12 for measuring a distance between the electronic device 1 and the to-be-measured object 2 is placed near the image capturing unit 11. In the present disclosure, the distance measurement unit 12 is an infrared distance measurement device. The distance measurement unit 12 can be adjusted to measure a vertical distance between the electronic device 1 and the to-be-measured object 2. The image capturing unit 11 is for capturing images in front of the electronic device 1. The angle of view of the image capturing unit 11 is θ.

The processing unit 13 includes a distance measuring module 131, an image capturing module 132, an actual size computing module 133, a proportion obtaining module 134, an object size computing module 135, and a displaying module 136. The distance measuring module 131 controls the distance measurement unit 12 to measure the vertical distance between the electronic device 1 and the to-be-measured object 2 in response to a measurement operation. The image capturing module 132 captures an image in front of the electronic device 1 in which an image of the to-be measured object 2 is included in response to the measurement operation. The actual size computing module 133 is for computing an actual size of the captured area according to the distance measured by the distance measurement unit 12 and the angle of view θ of the image capturing unit 11.

Figure 2:
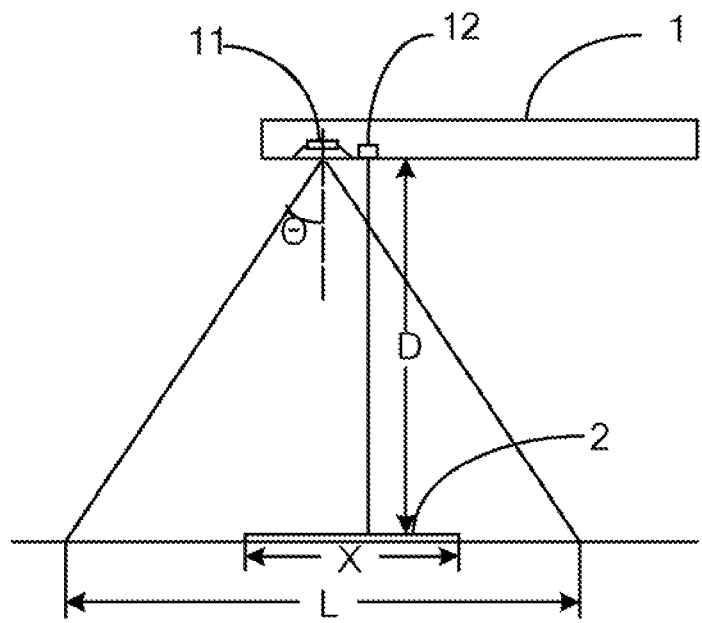
FIG. 2 is a schematic diagram for measuring a length of a to-be-measured object, in accordance with an exemplary embodiment, by the electronic device of FIG. 1.

Referring to FIG. 2, the vertical distance between the electronic device 1 and the to-be-measured object 2 is D, the angle of view of the image capturing unit 11 is θ, the actual length L of the captured area can be computed according to the relationship of side lengths and angles of a triangle, namely L=2*D*tg θ.

After the actual length of the captured area is computed, the proportion obtaining module 134 obtains the image of the to-be-measured object 2 from the captured image, and further computes the proportion K of the image of the to-be-measured object 2 in the captured image. The object size computing module 135 computes the length of the to-be-measured object 2 X according to the proportion K and the actual length of the captured area, namely X=2*D*tg θ *K. The width of the to-be-measured object 2 can be computed in the same way. The display module 136 displays the measured size of the to-be-measured object 2 on the display unit 14.

After the size of the to-be-measured object 2 is measured, the area of the to-be-measured object 2 can also be computed.

Figure 3:
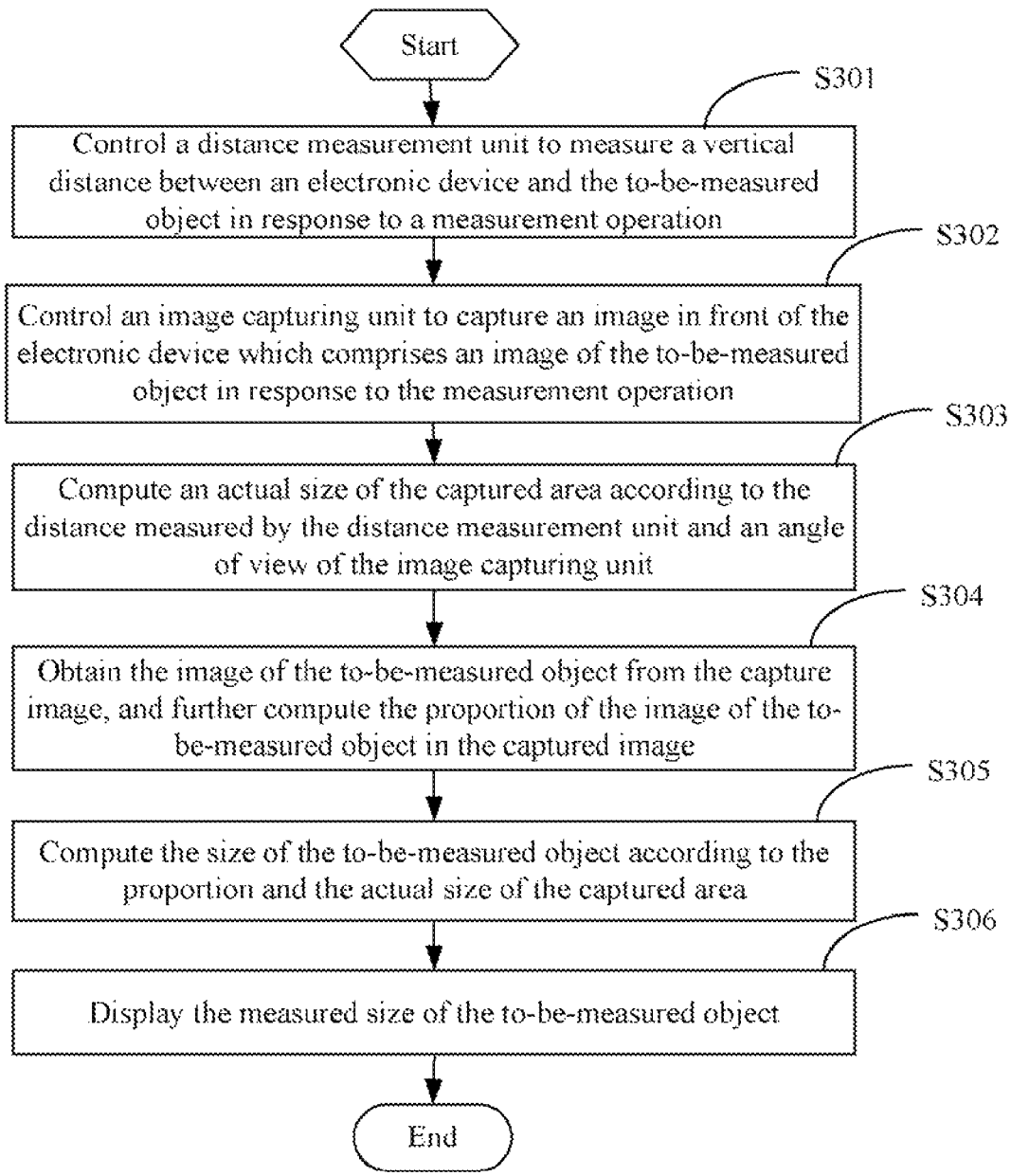
FIG. 3 is a flowchart for measuring a size of the to-be-measured object, in accordance with an exemplary embodiment, by the electronic device of FIG. 1.

FIG. 3 is a flowchart for measuring the size of the to-be-measured object 2 with the electronic device 1 of FIG. 1.

In step S301, the distance measuring module 131 controls the distance measurement unit 12 to measure the vertical distance between the electronic device 1 and the to-be-measured object 2 in response to a measurement operation.

In step S302, the image capturing module 132 captures the image in front of the electronic device 1 which includes the image of the to-be-measured object 2 in response to the measurement operation In step S303, the actual size computing module 133 computes an actual size of the captured area according to the distance measured by the distance measurement unit 12 and the angle of view θ of the image capturing unit 11.

In step S304, the proportion obtaining module 134 obtains the image of the to-be-measured object 2 from the captured image, and further computes the proportion of the size of the image of the to-be-measured object 2 in the size of the captured image.

In step S305, the object size computing module 135 computes the size of the to-be-measured object 2 according to the proportion and the actual size of the captured area.

In step S306, the display module 136 displays the size of the to-be-measured object 2 on the display unit 14.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An electronic device comprising:
    a distance measurement unit;
    an image capturing unit; and
    a processing unit, comprising:
        a distance measuring module for controlling the distance measurement unit to measure a vertical distance between the electronic device and a to-be-measured object in response to a measurement operation;
        an image capturing module for controlling the image capturing unit to capture an image in front of the electronic device which comprises an image of the to-be-measured object in response to the measurement operation;

an actual size computing module for computing an actual size of the captured area according to the distance measured by the distance measurement unit and an angle of view of the image capturing unit;

a proportion obtaining module for obtaining the image of the to-be-measured object from the captured image, and further computing the proportion of the image of the to-be-measured object in the captured image;

an object size computing module for computing the size of the to-be-measured object according to the proportion and the actual size of the captured area; and a display module for displaying the measured size of the to-be-measured object;

wherein the size of the to-be-measured object is computed by formula:

$X=2*D*tg\theta*K$, X represents the size of the to-be-measured object, D represents the vertical distance between the electronic device and the to-be-measured object, $\theta$ represents the angle of view of the image capturing unit, K represents the proportion of the image of the to-be-measured object in the captured image.

2. The electronic device as described in claim 1, wherein the distance measurement unit is placed near the image capturing unit.

3. The electronic device as described in claim 1, wherein the distance measurement unit is an infrared distance measurement device.

4. The electronic device as described in claim 1, wherein the distance measurement unit is adjustable.

5. The electronic device as described in claim 1, wherein the size of the to-be-measured object is a length and a width of the to-be-measured object.

6. A method for measuring size of a to-be-measured object, comprising:

controlling a distance measurement unit to measure a vertical distance between an electronic device and the to-be-measured object in response to a measurement operation;

controlling an image capturing unit capture an image in front of the electronic device which comprises an image of the to-be-measured object in response to the measurement operation;

computing an actual size of the captured area according to the distance measured by the distance measurement unit and an angle of view of the image capturing unit;

obtaining the image of the to-be-measured object from the captured image, and further computing the proportion of the image of the to-be-measured object in the captured image;

computing the size of the to-be-measured object according to the proportion and the actual size of the captured area, wherein the size of the to-be-measured object is computed by formula: $X=2*D*tg\theta*K$, X represents the size of the to-be-measured object, D represents the vertical distance between the electronic device and the to-be-measured object, $\theta$ represents the angle of view of the image capturing unit, K represents the proportion of the image of the to-be-measured object in the captured image; and displaying the measured size of the to-be-measured object.

7. The method as described in claim 6, wherein the size of the to-be-measured object is a length and a width of the to-be-measured object.

* * * * *